United States Patent [19]

Bailey

[11] Patent Number: 5,042,189

[45] Date of Patent: Aug. 27, 1991

[54] SELECTIVELY CONVERTIBLE FISH LURE

[76] Inventor: Charles T. Bailey, 384 Main Rd., Westhampton, Mass. 01027

[21] Appl. No.: 516,530

[22] Filed: Apr. 30, 1990

[51] Int. Cl.⁵ ............................................ A01K 85/00
[52] U.S. Cl. .................................. 43/42.09; 43/42.39; 43/42.41; 43/42.22
[58] Field of Search ................ 43/42.39, 42.09, 42.41, 43/42.32, 42.45, 42.47, 42.4, 42.22, 42.06

[56] References Cited

U.S. PATENT DOCUMENTS

| | | | |
|---|---|---|---|
| 2,036,954 | 4/1936 | Murray | 43/42.39 |
| 2,940,204 | 6/1960 | Mehnert | 43/42.39 |
| 4,229,899 | 10/1980 | McGahee | 43/42.09 |
| 4,689,914 | 9/1987 | Quinlan | 43/42.22 |
| 4,709,499 | 12/1979 | Ottariano | 43/42.06 |

Primary Examiner—Kurt Rowan
Assistant Examiner—James Miner
Attorney, Agent, or Firm—Ross, Ross & Flavin

[57] ABSTRACT

A fishing lure is disclosed having the capability of being selectively operable between a plurality of different modes of operation. The lure may be arranged to remain on the surface of the water while trolling or it may be arranged to dive below the surface. The body of the lure is of one piece unitary construction having a selectively positionable weighting means whereby the lure may be selectively weighted as a function in determining the depth to which the lure will descend.

1 Claim, 1 Drawing Sheet

SELECTIVELY CONVERTIBLE FISH LURE

THE INVENTION

The invention relates to fishing lures and more particularly to fishing lures which may be selectively manipulated or modified to operate on or near the surface of the water or below the surface.

The desideratum herein has been to provide a fishing lure capable of being easily switched between a plurality of modes of operation, yet which is simple in its design and readily manufactured at relatively low cost.

The concept of the invention envisions three lures in a single assembly, all to the end of accelerating the time involved in converting from one bait mode to another, not to mention the economies realized herewith.

The invention teaches fishing lures which incorporate means for facilitating the changing of the weights taken from a selection of different weights having various weight factors calculated to cause the fishing lure used therewith to achieve buoyancy at the surface or at predetermined depths in fresh or salt water.

Over the years, it has been generally recognized that fishing lures resembling small bait fish, such as minnows or shiners, offer unusually successful fish-catching characteristics as they uniquely imitate the primary forage of many sought after game fish.

As such, many if not most of the lures in the marketplace today try to imitate that forage, like minnows or shiners or other small fish species.

The most common prior art lures have proven over and over again their effectiveness in catching fish because they imitate the live minnow or shiner. However, such known types of lures each have the basic disadvantage of not being weedless or snagproof; they normally have several sets of treble hooks and forwardly extended diving lips which can get snagged and caught on weeds or stumps.

Largemouth bass, northern pike, and chain pickeral, are a few of the commonly sought after fresh water game fish which are cover oriented. That is, they spend most of their natural life in thick weeds, bushes, lily pads, stumps, fallen trees, and other thick underwater growth which offer them cover so they can hide to ambush prey which may happen to swim within striking distance.

Fishing in this cover with a lure which is not weedless or snagproof is next to impossible, ergo the reason why some lures have been designed with weedless hooks or hooks which are hidden within the lure body so as to make them snagproof and enable them to be used in thick cover without hanging up.

On the commercial marketplace today, there exists a wide variety of soft bodied lures. Such a lure has the advantage of a fish not immediately spitting it out of its mouth upon striking. Instead, the fish usually trys to swallow the soft bodied lure because it feels like natural food. Many of the soft bodied lures are made out of soft plastic or rubber and are molded to resemble various types of forage, such as crayfish, worms, frogs, insects and, of course, minnows or shiners.

The invention lends itself to acceptable and efficient use in any normal aquatic environment. It is structurally such that it is virtually anti-fouling and is designed and adapted to ensure animated action when it is being trolled or retrieved.

The invention also teaches new and novel construction for a fishing lure device with chemical fish attractants. The lure is so constructed that the user is enabled to quickly and easily add thereto an olfactory attractant.

BACKGROUND OF THE INVENTION

Fishing lures having various mechanisms which may be manipulated to select one of two modes of operation are known in the art. In one such mode of operation, the lure will remain on or near the surface of the water when trolling and in the other mode of operation the lure will dive below the surface.

Such fishing lures fall into two distinct categories of structure. The first catagory includes a single piece construction of the body of the lure so that to effect one of the two modes of operation, the hook and fishing line must be attached to specific places on the body of the lure. With this type construction, when one wishes to change the mode of operation the fishing line and hook must be removed and reattached.

The other catagory includes lures having bodies which are composed of two or more parts held together by various combinations of springs, pins, washers, and screws or clips.

Such structures as are known add significantly to their cost of manufacture. Worse they detract from their reliability due to the usual complexity and number of interacting parts.

Fish feed at different depths as a function of food availability, water temperature, salinity, and a variety of environmental factors. This necessitates that a successful fisherman present his bait to the fish at the depth at which they are currently feeding. This is not always possible when artificial baits are used because the artificial bait or lure, which has the most appealing motion through the water for the particular species of fish being sought, may not operate properly at the depth at which the fish are swimming.

Artificial baits or fishing lures used for trolling, casting, or jigging are normally designed to operate at predetermined depths.

The depth of operation of a fishing lure is normally the function of the density of the lure assembly, its hydrodynamic shape and speed of motion.

Lure density and shape are usually fixed during manufacture so that the depth, at which it operates properly, is fixed so that the fisherman cannot vary the operating depth of a lure to place the lure at the same depth as the fish.

In some cases, a lure may be made to dive deeper or shallower by varying the retrieval rate but the shape of a lure dictates that it should be retrieved or trolled at a set speed to achieve the most lifelike action.

Thus, the successful fisherman has to carry a variety of lures designed to operate at various depths at which fish may be found. In many cases, a lure having the proper motion through the water does not have the proper density and, therefore, the lure which should be most successful in attracting fish fails to reach them.

It is accepted practice in the sport of fishing to employ a plurality of rods and reels for successful fishing, each with a different lure, the rationale being that when a fish strikes and misses one lure, the chance is increased that that fish will not strike that lure again, at least immediately.

Ergo the option afforded the fisherman to select a different lure on a different setup, all in the effort to persuade the fish to strike anew. At least there is a certain mental balm for the fisherman in believing that such a system works.

Experience has shown that where a fish, let us say a bass, strikes at a surface lure and misses, the bass will normally head for or more in the direction of the water's bottom.

Were the fisherman to reel in the surface lure quickly and to cast out a crank bait or a jig bait to the area where the bass is believed to have moved, there is an improved opportunity for catching same.

BEST MODES FOR CARRYING OUT THE INVENTION

Figure 1:
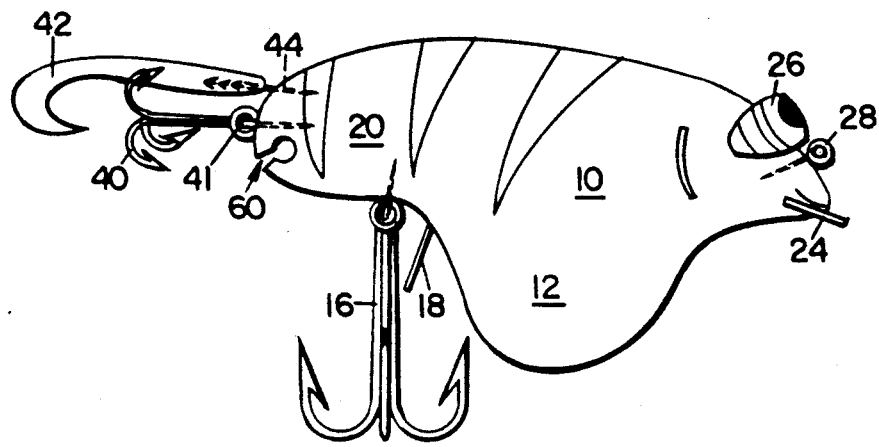
FIG. 1 is a view in front elevation of the lure body.

The principal types of fresh water game fish suitable for responding to the attractions of the lure are bass (largemouth and smallmouth), walleyes (in both shallow water and deep water fishing), pike (particularly during the spring thaws following spawning), musky-like pike (especially in warmer waters), catfish, and trout (especially of the brown and rainbow types).

As known, game fish are attracted to erratic movements such as the lure hereof allows.

The lure hereof is referred to as a three-in-one lure in that it may selectively serve as a so-called "crank bait", a so-called "jig bait", and a so-called "surface bait".

Nomenclaturewise, I refer to the lure as a "crank-n-jig", it serving as a cranking lure and as a jig lure.

The lure comprises a body, preferentially of a polymeric material, and is generally shown at 10. It may be of a configuration to simulate any desired live bait and include suitable hook and line attachment components.

Body 10 is of a one-piece unitary construction and, as aforesaid, is preferentially of polymeric material, but may be made of wood, metal, or other suitable material.

Body 10 is preferably of a configuration delineating an enlarged belly 12 which helps to keep attached hooks from snagging on rocks, logs or other hangups. The belly curvature aids in giving a lift to the lure.

The body will be provided in different sizes and colors for accommodation to fish as small as the pan fish size to as large as the salt water size.

The lure is of a snagless type configured in the shape of a bait fish so as to offer a wobbly swimming action when retrieved through the water or an erratic movement when the rod tip is twitched on retrieve. Desirably, the lure gives the appearance of and the action of a fish experiencing trouble.

It is of requisite length and cross section to assure proper weight and balance so as to make for easy casting without encountering fouling on the cast, troll or retrieve.

It is an anti-fouling fish lure adapted for use in any aquatic environment characterized by a fishhook 16 extending downwardly of the bait and a hook holding fixture 18 adjacent the rearward region thereof. Hook holding fixture 18 is for keeping the hook 16 straight out from body 10 for better hooking ability when a strike occurs while lure is facing down.

A lip 24 which may be rigid or flexible projects outwardly from body 10 at the front portion thereof and serves to dig into the floor or bottom to cause debris to be upset when and as the lure is lifted upwardly in a jigging motion. It is relatively flat in configuration so as not to scoop up as much water as the usual scoop-like device.

The angularization of the lip with respect to the body allows the lure to be snagless as it easily sheds any encountered snags.

A plurality of threaded eyes 26 are provided, same being interchangeable so as to be selectively employed during a fishing program. Each eye may be threadedly engaged with an accommodating eye socket in the body with one turn of an eye accomplishing the interengagement so as to allow fast and easy replacement by which the fisherman can quickly adapt to a new fishing situation.

The eyes will be of different weights, a non-weighted eye when the lure is used as float bait, an intermediate weighted eye when the lure is used for crank bait when slow trolling in 12' of water or less, and a heavier eye for use as a weight with a fast drop jig in deep water. The eyes are weighted at their bottom or inner portions so that the weight is at the inside or within the socket when the eye is screwd into position. In this way, the front of the lure is kept from being top heavy and rollover is precluded.

The body itself is of the float type. It is the weight of the eye which gives it its relative sinkability (slow to fast); the heavier the eye the faster the sinking motion. When the lure is weighted with a slow sink eye, it helps to allow the lure to sink to a desired depth and then to reel the line in as a crank bait.

A tie 28 is located at the tip of the nose of body 10 being inserted into the body and retained thereby, and a line (not shown) is fixed thereto in the conventional manner.

The point of attachment of line to body is above the lure's center of gravity, so as to allow a side-to-side arc sweeping motion particularly by reason of the encountered water resistance when in use.

The construction is such that the lure can sink or float freely after casting or when it is trolled or otherwise pulled through the water being fished. Experience has shown that the sweeping arc in action is noticeably progressive the faster the lure is pulled, with the fulcrum of the arc being at the point of line attachment. However, under normal trolling speeds and reel-retrieving action, the weight of the lure and its lower center of gravity controls the wobbling side-to-side motion without allowing full rotation about its longitudinal axis.

As known in fishing, a jig is a means to allow a drawing through the water or a jerking up or down.

Figure 3:
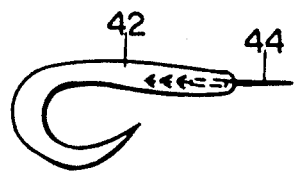
FIG. 3 is a view of the imitation worm attachment.

The tail of body 10 is provided with a pair of spaced openings or recesses, in one of which a treble hook 40 may be inserted and in the other of which an imitation worm or grub 42 (see FIG. 3) made of rubber or the like may be inserted through the means of an intermediate holder 44 interconnecting between worm 42 and body 10.

Body 10 is also provided with a treble hook 40 and an eye fitting or connector 41 for attaching the hook to the body.

If desired, one of the hooks of the treble hook may be inserted into the tail of the worm, as shown in FIG. 1.

Figure 2:
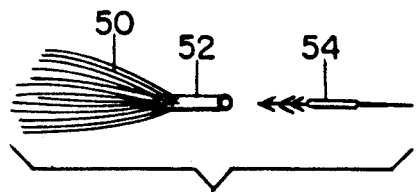
FIG. 2 is a view of the two-part skirt attachment.

Alternatively, a skirt attachment 50 (see FIG. 2) made of rubber or other suitable material may be inserted in one of the recesses in lieu of the worm, the skirt being provided at its forward end with a tubular formation 52 which may be sleeved over a connector 54, one end of which is engaged with the skirt and the opposite end of which is inserted into the lure body.

Body 10 may also include a rearward recessed cavity 60 for receiving therein a charge of a chemical olfactory or chemiluminescent attractant. Same may be injected thereinto or may be dispensed from an accessory tube or bottle of the composition (not shown) whereby a fisherman's favorite scent may be applied to the lure.

The attractant may be quickly and easily inserted and removed relative to the body for quick and easy interchangeability with new and/or different systems. For example, for certain fishing conditions, it may be appropriate to utilize different chemiluminescent chemical substances for a particular type of fish and/or for various fishing conditions such as the color of the water as well as the time of day.

At other times, it may be appropriate to utilize various olfactory attractants. Also, the device of the present invention allows for use of both chemiluminescent and olfactory attractants simultaneously, so that the invention is adapted for use under any fishing conditions. It is to be recognized that the attractants can be effectively utilized with practically any lure (e.g. fish, frog, tadpole, squid) configuration.

Figure 4:
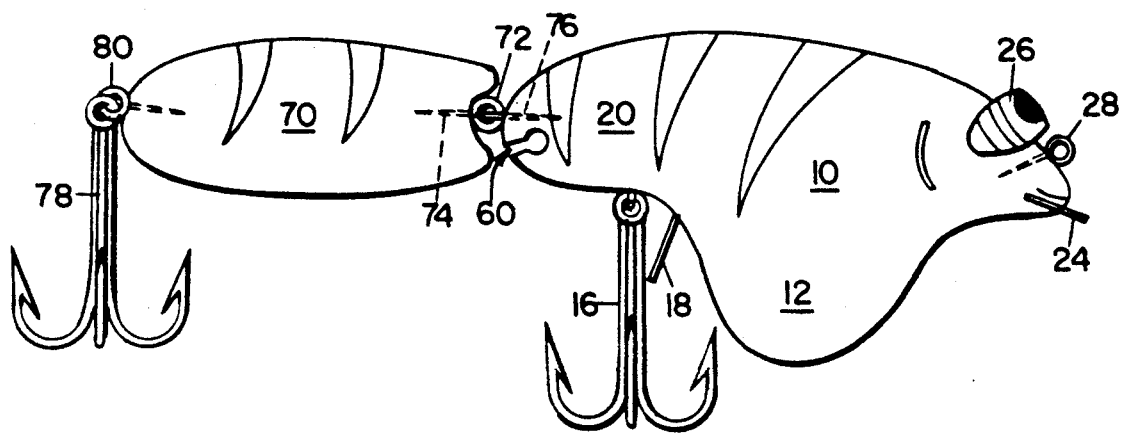
FIG. 4 is a view in front elevation of the FIG. 1 lure body with a tail attachment.

Now, referring to FIG. 4, the lure additionally envisions a floating tail 70 which may be selectively called into play so as to allow increased lure movement. The tail will help to keep the lure in a substantially straight vertical direction of movement as it is motivated downwardly, wherefor the fish is offered a better view thereof, not to mention that such movement realizes an increased tendency to keep the hooks free of snagging.

The "jointed" lure looks like and acts like a real bait fish with erratic movements so attractive to fish.

The tail attachment includes an eye fitting 72 and cooperant connecting pins 74 and 76 which are insertable into respective recesses provided in body 10 and tail 70 whereby the two components are thus interengaged.

Tail 70 is also provided with a depending hook 78 and an eye fitting or connector 80 for attaching the hook to the tail.

The tail maintains the lure in a substantially vertical disposition on any descent so as to allow a better view for the fish as well as to keep the hook away from any snags. Also, it helps to keep the lure in the vertical disposition when on the water bottom. The front is alternately picked up and dropped when used as a jigging lure.

The key to the inventive concept is predicated on speed—speed in modifying the lure to suit the encountered fishing condition. The faster the changeover, the better the chance of catching a missed fish.

With the lure, the fisherman need only change the eye of say a surface lure to convert same either to a crank bait or a jig bait, or a combination of the two, so as hopefully to lead him to his objective, the eye being the replaceable weight means for converting the lure from mode-to-mode, the effective density of the lure being changed so that it may be properly presented to the fish regardless of the depth at which they are feeding.

If the fisherman is close to a strike with his crank bait, but misses same, he can stop the retrieve and allow the lure to sink slowly toward the bottom so as to retrieve as a jig lure.

And significantly, I have provided a simple means for attaching and removing any of the preselected weighted eyes without the aid of any special tools.

The selectable feature is such that one weight of the eye in the body will cause the lure to remain on or near the surface of the water, and other weights of eyes will cause the lure to dive substantially below the surface of the water, at either a fast or slow rate of speed.

Further, debris along the water's bottom may be raised by the action of the lure lip which additionally generates a type of motion which serves as a fish attractant.

Additionally, a rattle-like noise may be optionally employed to offer a further fish attractant.

And significantly, I have provided a simple means for attaching and removing any of the preselected weights without the aid of any special tools.

Further, debris along the water's bottom may be raised by the action of the lure lip which additionally generates a type of motion which serves as a fish attractant.

Additionally a rattle-like noise may be optionally employed to offer a further fish attractant.

Likewise on any upward motion through the water, as generated by the fisherman's action on the line, an improved sense of swimming action is seen by the fish.

The selectable feature is such that one weight of the eye in the body will cause the lure to remain on or near the surface of the water, and other weights of eyes will cause the lure to dive substantially below the surface of the water, at either fast or slow speed.

When fishing in an area known to be plentiful with game fish, the lure can be retrieved as a crank bait. As the subsequent retrieval ensues, the lure may be allowed to drop with twitches of the rod tip providing it with increased activity on the retrieve.

I claim:

1. A selectively-convertible anti-fouling fishing lure in the form of an artificial fish for use near the water surface or in deeper water and being readily convertible between a plurality of modes of operation as a crank bait or a jig bait or a surface bait and being capable of animated action when trolled or retrieved and having a central longitudinal axis and comprising:
   (a) a head portion having means for receiving and retaining a selected one of a set of variously-weighted eyes and having an angularized extending lip projecting outwardly from and forwardly of the head portion for digging into the water floor and providing a jigging motion as the lure is lifted upwardly,
   (b) a central body portion delineating an enlarged belly for protecting depending hooks from snagging and for providing lure lift on the ascent and being symmetrically arranged about the longitudinal axis and integrally joined to the head portion,
   (c) a tail portion of predetermined external configuration symmetrically arranged about the longitudinal axis and integrally joined to the central body portion and being provided with a pair of spaced recesses, in one of which a treble hook is insertable and in the other of which an imitation worm is insertable.

* * * * *